INVENTOR
Richard L. Swartz
BY
Kenyon, Palmer, Stewart & Estabrook
ATTORNEYS

United States Patent Office 3,288,038
Patented Nov. 29, 1966

3,288,038
ARTICLE SORTING AND STACKING MACHINE
Richard L. Swartz, Columbia, S.C., assignor to Universal Business Machines, Inc., Columbia, S.C., a corporation of South Carolina
Filed Dec. 2, 1963, Ser. No. 327,409
19 Claims. (Cl. 93—93)

This invention relates to a machine for sorting and stacking flat articles into a plurality of stacks, the number of articles deposited in the respective stacks being controlled in accordance with a pre-set schedule or program. While my machine is designed especially for stacking magazines, it is capable of use in sorting and stacking other flat articles which are capable of being stacked. Accordingly, in the following description, the term "magazine" is employed for convenience of description only and is not used by way of limitation.

Stacking machines for the same general purpose have been proposed before, see, for example, U.S. patent to Jochem, 2,769,378, but my stacking machine embodies improvements over machines heretofore devised.

The specific embodiment of the machine disclosed herein has been designed for performing automatically certain operations which heretofore have been performed manually for sorting and stacking magazines which have been processed by a label-applying machine, such as a Cheshire machine, which delivers the magazines in succession with an address label applied to each magazine giving the address to which the magazine is to be sent. The usual operation has been to discharge the magazines from the labeler onto a slow moving conveyor belt in a shingled or overlapping manner with each address label visible, then scoop up manually what appears to be the desired number of pieces, count them, then add or take away pieces as needed to have the proper count in a stack, which then goes to a tying machine. All the magazines in any stack are for the same city. The desired size of the stack is approximately four inches thick. The last stack to a particular "city" designation may have any number of pieces less than the desired amount.

Broadly, my stacking machine is formed of a conveyor for receiving a succession of individual magazines from a labeling machine to be stacked according to their town destinations. The conveyor may be provided with a pivoted end section for transferring the magazines from the labeler onto a horizontal transporting guideway. A storage device delivers a coded signal which controls electrical devices for selecting and operating in a cycling operation any one of a number of tiltable gates arranged at spaced stations along the length of the horizontal track or guideway. As the magazine is conveyed along the guideway and reaches the sequenched station, the tilted gate at that station will deflect the magazine down into a stacking bin where the magazine will be received by a vertically movable platform; a counting device is provided for controlling the number of magazines to be received by the platform, and magazine operated devices are provided to effect the intermittent vertical descent of the platform in order that magazines will not jam the entranceway. After the platform has received a predetermined count of magazines destined for one particular town, control circuits will cause the platform to descend and contact an ejection device allowing the stack of magazines to be discharged onto a conveying device for other handling purposes such as tying and bundling. Other control circuits are provided to sequence the next stacking bin for operation.

The invention contemplates the use of control signals to shut down the operated gate in accordance with the reception of a signal from a coding device indicating that the number of magazines for a particular town is below the predetermined minimum number to be received by any one of the storage bins, thus allowing these magazines to be conveyed off the end of the horizontal track into a receiving or reject bin.

A general object of the invention is to devise a stacking machine of relatively simple construction and one that is certain in operation, that is, a machine that will stack magazines or the like accurately aligned to a specified number and according to town destination within a plurality of the stacking bins, the stacking operation being cycled in accordance with the specified town destination of the magazines.

Specific objects of my invention are as follows:
(a) To devise a stacking machine that can be used in connection with a labeling machine and including a novel electrical control system for controlling the speed of operation of the stacker in pieces per hour;
(b) To devise a stacking machine that selectively stacks articles within a plurality of stacking bins according to the town destination of the article and provides novel ejection means for discharging the stack after a predetermined number of the articles have been collected within the sequenched stacking bin;
(c) To devise an improved stacking device which is operated in cycles in accordance with novel control circuits which sequentially operate the tiltable gates to a plurality of stacking bins in a cyclic operation and a novel control circuit for closing an operated tilt gate in the event that the articles destined for a particular destination are below a predetermined count (number); and
(d) To provide a novel control circuit for automatically operating the receiving platform within a storage bin to allow the platform to adjust itself in order that it may properly receive further articles until the platform has received a predetermined count of articles, whereupon the control circuits cause the platform to descend and eject the stack of articles and automatically reset the platform to its standby position after the completion of cycle of operation.

One embodiment of my invention is illustrated in the accompanying drawings in which.

*Mechanical description*

Figure 1:
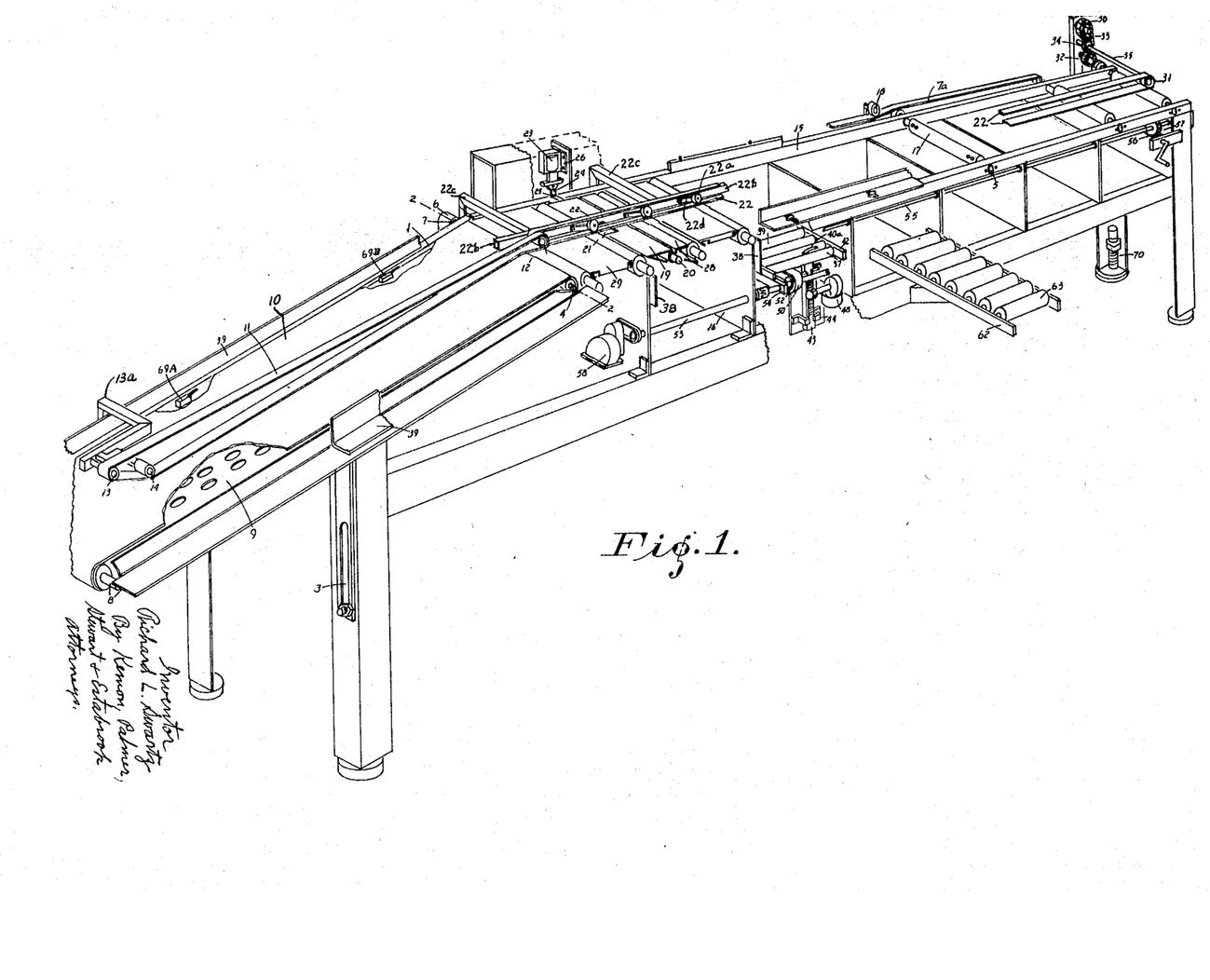
FIGURE 1 is a perspective view showing the complete machine, but not in full detail.

The mechanical structure of the sorting and stacking machine will be described with reference to FIGURES 1 to 5.

Where the machine includes the pivoted end section for transferring magazines from the labeler to the horizontal trackway, the pivoted section will include an inclined conveyor frame 1 which consists of a pair of parallel bars assembled with through bolts and spacers and having its rear end pivotally connected to a horizontal track frame on a horizontal pivotal axis 2. The front end of the pivoted section is supported on brackets 3 adjustably secured to the front legs of the machine frame thus allowing the front end of the transfer section to be adjusted to various vertical elevations, to allow for different levels of discharge from the labeler. A conveyor belt 10 is supported between two end rollers 4 and 8 and is driven by the roller 4. The rollers 4 and 8 are supported by stub shafts that are secured to the roller by screws. The roller shafts are supported by ball bearings 5 held in the side frame. The rollers, shafts, and bearings are readily removable for servicing or replacement without materially removing other parts. The stub shaft for roller 4 is extended at 6 beyond the frame 1 to accommodate a drive pulley 7 of the V-type. The roller 8 is mounted in a movable block for belt tension adjustment in the usual manner. A perforated plate 9 is provided to support the upper reach of conveyor belt 10 and prevent suction drag.

Mounted on top of the pivoted conveyor section, along the middle thereof, is a tension belt 11 of the poly-V type which presses the magazines against the belt 10 to provide the necessary traction to move the magazines up the incline at the speed at which they are required to be moved. The presser belt 11 is driven by a pulley 12 located over the first roller on the horizontal section of the stacker and is supported at the stacker receiving end by an adjustable pulley 13 supported on bracket 13a and is held in tension against the conveyor belt 10 by a torsion spring-loaded idler roller 14 supported on the same bracket.

The horizontal track section 15, FIGURE 1, consists of a pair of parallel bars held together by through bolts and spacers and is rigidly secured to the machine frame. Receiver bin separator plates 16 are secured to the parallel bars at spaced points along the trackway. The horizontal track section also includes two impulse rollers 17, for each receiving bin; the rollers 17 are supported in the same manner as the rollers 4 and 8, and may be driven by the same poly-V belt 7a that drives pulley 7. The tension, however, is adjustable by means of an idler tension roller 18 engaging belt 7a, one such roller being mounted adjacent to each impulse roller drive pulley. The track section also includes a series of gates 19 incorporated in the floor of the trackway, one gate for each pocket, located at the leading edge of each pocket directly behind and slightly below the top surface of the first impulse roller for that pocket. A baffle 28 is located directly behind each gate to deflect the magazine further downward to prevent it from striking the underside of the track impulse roller 17. The top side of this baffle is on the same plane as the upper surface of the gate 19 when it is in a closed position, and thus forms part of the track floor surface. Another baffle 29 is located between and slightly below the top surface of the remaining impulse rollers for each bin to form the remaining portion of the track floor surface for magazine travel for that bin. The baffles are secured to each track frame with suitable screws and are removable.

A tension belt 22 is mounted on top and approximately in the center of the track, and the bottom reach of the belt is pressed into contact with each track roller by a spring loaded idler roller 22a located at each track roller. The presser rolls 22a are located between the two reaches of belt 22 and are mounted upon a rail 22b extending along the length of the trackway and supported by brackets 22c, each roll 22a being rotatably supported at the end of an arm 22d having its other end pivotally attached to the rail 22b by spring means which causes the roller to press downwardly against the lower reach of belt 22. The tension of belt 22 is sufficient to prevent slippage, yet it is also sufficient to allow magazines to be removed easily should a jam occur. The tension belt 22 is driven from the rearmost torsion spring loaded tension pulley 31, at a speed such that the surface of the belt that is in contact with the track rollers 17 is moving at the same speed as the roller surfaces and maintains pressure on the magazines at all times.

The drive for the tension belt is from a sprocket 32 which is mounted on the rearmost track roller shaft, through a chain 33 whose back side drives the sprocket 34 which is mounted on the tension belt drive shaft 35. The chain 33 is held in adjustment by the adjustable idler sprocket 36. The tension belt drive sprocket 34 is narrower than the chain to allow the tension belt drive shaft 35 to pivot as magazines pass under the drive pulley 31 and off the end of the machine to a reject pocket or tray at the right end of the machine. The tension belt drive shaft 35 is mounted in a self-aligning ball-bearing at each end.

As already explained, a series of storage bins for receiving the magazines that are discharged downwardly through the various gates as they are opened are arranged below the trackway in the spaces between adjacent separator plates 16. Each stacking bin is constructed in the same manner for receiving, stacking and discharging a completed stack of magazines. Only one such bin is shown in detail in the drawings, FIGURES 1 through 5, but it will be understood that each bin is constructed and operates in the same manner.

Figure 2:
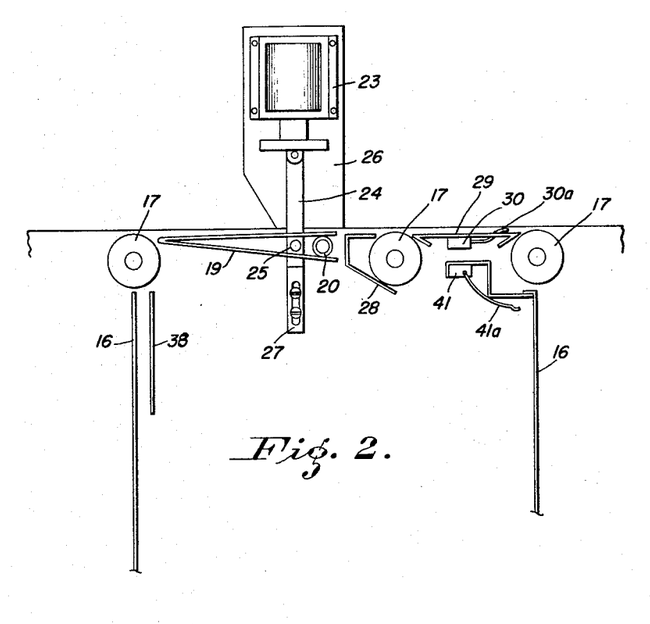
FIGURE 2 is a side elevation (with parts removed) showing the horizontal track section for one storage bin, a pair of pocket separators, and one rebound plate for the storage bin.

The gate 19, FIGURES 1 and 2, is preferably constructed of sheet metal in wedge form with the trailing edge welded to a tubular member which has a pivot bearing in each end. The gate pivot stud 20, FIGURES 1 and 2, is mounted in each track frame with set screws mounted outward of the track frame in such a manner as to permit removal. The leading edge of the gate is slotted at 21 immediately below belt 22 to allow the gates to be raised on each side of the tension belt in order to deflect a magazine downward into the storage bin.

The gate is raised through the action of a control solenoid 23, FIGURES 1 and 2, which acts on a gate control stud 25 through a link member 24. The solenoid is energized when a snap-action switch 30 located on the lower face of baffle member 29 in the second bin in front of the gate, is actuated by a magazine. The feeler finger 30a of switch 30 extends upwardly through an opening in baffle 29 to be operated by a magazine passing over the baffle. The maximum gate opening may be changed by vertically adjusting solenoid bracket 26 on the track frame member 15. The downward limit of gate travel is controlled by an adjustable stop 27, FIGURE 2, directly beneath the gate link 24.

A magazine entering through the open gate will be deflected downward by a baffle member 28 located directly behind the gate 19. This baffle prevents the magazine from striking the underside of the track impulse roller 17.

As the magazine enters the pocket, it is clamped under pressure between the track roller and tension belt throughout its entire width; the leading edge of the magazines strikes a pocket separator 16, which acts as an impact plate, and the trailing edge of the magazine falls inside of an adjustable rebound plate 38, FIGURES 1 and 2. The adjustable rebound plates are secured to a pair of parallel rods 55 extending along the length of the trackway. These rods are movable longitudinally by means of two worm gears mounted on a common shaft and turned by a hand crank 56 that turns the two threaded worm gears 57 on the threaded rods 55, and the resulting lengthwise movement of the rods causes the simultaneous adjustment of all of the rebound plates.

Even stacking of the magazines is achieved in each storage bin by the adjustment of the rebound plates and the guide members 39 located on the conveyor and horizontal track, to conform to the size of the magazines being stacked.

Each bin is provided with a receiving platform 37 carrying rollers 59 whose axes are aligned horizontally parallel to the track action direction of travel of the magazine. The platform is provided with a snap action switch 40, FIGURES 1 and 4, mounted between two of the platform rollers and with its feeler finger extending upwardly to a position to be actuated when a magazine falls onto the platform. The switch prepares a circuit for downward movement for the elevator, the operation of which will be described subsequently. The platform will not descend, however, until enough magazines have been accumulated on the platform to cause the operation of height control switch 41 through the upward movement of its operating arm 41a, the switch 41 being mounted in the top of the bin on a bracket carried by the back separator 16. The platform will then be lowered until the height control switch 41 opens, and this operation will continue as long as the pocket is being filled.

Figure 3:
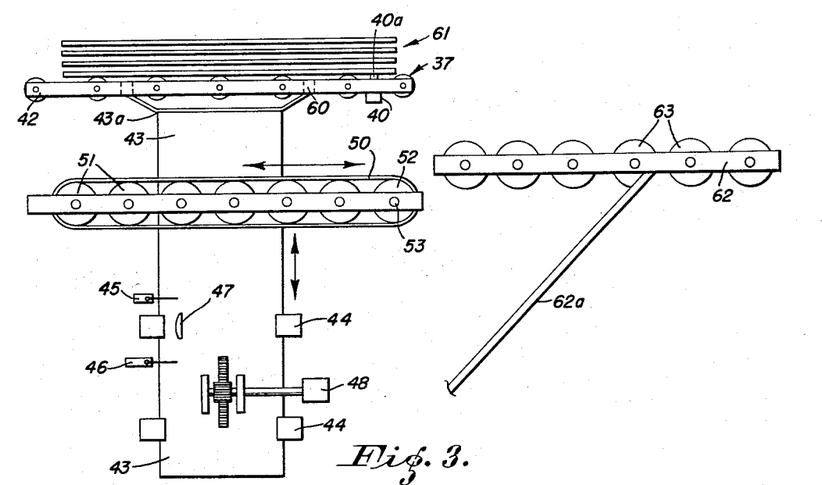
FIGURE 3 is a side elevation of the receiving platform, its vertically moving supporting post, the ejection belt, and the gravity ejection platform.
Figure 4:
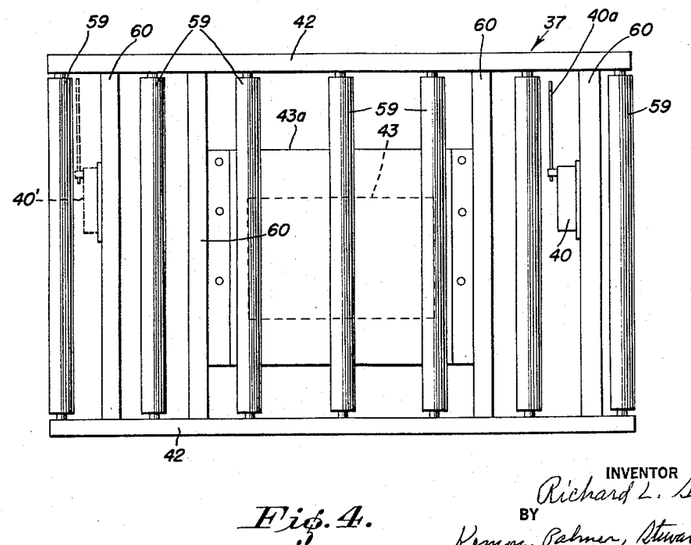
FIGURE 4 is a plan view of a magazine receiving platform on a somewhat larger scale than FIGURE 3.

Each pocket platform consists of a pair of parallel bars 42, FIGURES 1, 3 and 4, that are held together with bolts and spacers. The platform rollers 59, FIGURES 1, 3 and 4, are suitably journalled in bearings carried by the parallel bars 42. The platform is supported by a T post 43, FIGURES 1 and 3, with two of the bar spacers 60 secured to the horizontal section of the post. The vertical section of the post is held by two guide members 44 that allow vertical movement of the post within limits that are controlled by the top and bottom limit switches 45 and 46, FIGURE 3. These switches are actuated by a cam member 47 secured to the vertical post. Movement of the platform and post is effected by a gear motor 48, FIGURE 1, through a suitable drive, such as a rack and pinion drive between the T post and the motor so that in the down direction of travel the platform's rollers will come into contact with the ejection belt 50, FIGURES 1 and 3.

The ejection belt 50 is preferably supported by a number of idler pulleys 51 and a drive pulley 52, FIGURE 3, mounted in a fixed frame or rack 54 located directly beneath platform 37. The ejection belt drive pulley 52 is driven through a drive shaft 53, FIGURE 1, from an ejection gear motor 58, FIGURE 1, which is a reversible electric motor for either front or rear ejection delivery.

When the platform rollers 59, FIGURES 1, 3 and 4, contact the ejection belt 50, rollers 59 are turned in a direction to move the stack of magazines 61, FIGURE 3, onto the gravity ejection platform 62, FIGURES 1 and 3, which consists of a series of ball-bearing rollers 63 mounted within a frame 62 having one end thereof pivotally connected with the machine frame to permit pivotal movement of the frame about a horizontal axis. The frame is held in a desired position by means of an adjustable brace 62a to allow the outer end of the ejection platform to be adjustable from horizontal to a lower position as required to maintain the necessary momentum of the stack of magazines across the gravity rollers. This gravity ejection platform may be attached to either side of the machine for either front or rear ejection delivery.

As the trailing edge of the stack of magazines leaves the pocket platform, the platform switch 40 that was depressed is released and returns to its normal position, thus selecting the up direction of operation for the platform motor; the platform is then returned to a position about one inch below the bottom of the horizontal track section, whereupon the top limit switch is actuated and the motor is deenergized. The switch 40 carried on the movable platform 37 has two mounting positions on the platform for either front or rear ejection delivery.

Figure 5:
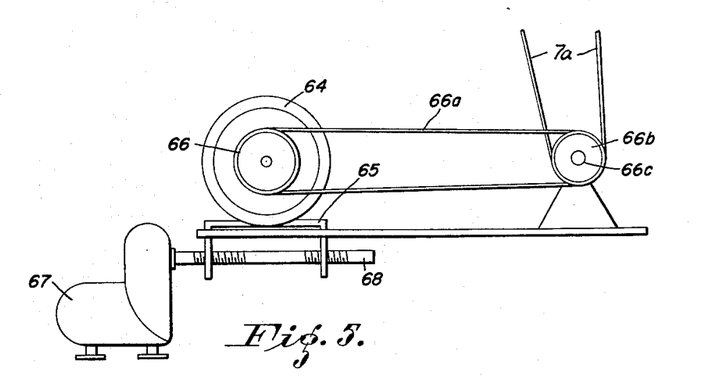
FIGURE 5 is a side view of the power source for the conveyor, showing one form of variable-speed transmission.

The power source for driving the conveyor belt, track rollers, and tension belts is from a constant-speed electric motor 64, FIGURE 5, which is mounted on a movable base 65 and has a power takeoff for the conveyor belt, track rollers and tension belt from a variable speed V pulley 66 which is coupled through a V-belt 66a to a pulley 66b mounted on a countershaft 66c. Although I have shown the use of a spring loaded split-sheave pulley 66 to vary the speed of transmission between the motor 64 and the countershaft 66c in order to vary the stacker speed, it is understood that any conventional variable-speed transmission may be employed in my invention. The motor base is moved by gear motor 67 turning a threaded shaft 68. The speed control gear motor 67 can be controlled either through a manually operated switch for machine speed regulation, or the speed may be controlled through an automatic speed control system using switches 69, FIGURE 1, mounted on the inclined conveyor section and spaced for the proper flight distance of the magazines. The flight distance is measured from the leading edge of a first magazine to the leading edge of a second magazine.

The flight distance is just enough so that the magazines when on the horizontal track section of the stacker will not have two sequential track switches 30 pressed simultaneously.

*Electrical description*

The electrical operation of the magazine stacker utilizes a series of relays to transmit electrical signals to cause the operation of control relays and solenoids in conformance with either of two signals which may be either manually or automatically impressed upon the control circuits.

The horizontal track control circuits perform two primary operations in compliance with the overall objects of the magazine stacker, a "town" operation whereby the number of magazines marked for a particular town destination are counted and stacked within the bins, and a "singles" operation whereby the number of magazines for another destination below some minimum count, for example, below 5, are rejected through a control operation whereby the open gate is closed thus allowing the singles to be swept off the horizontal track section of the stacker at the far end.

Figure 6:
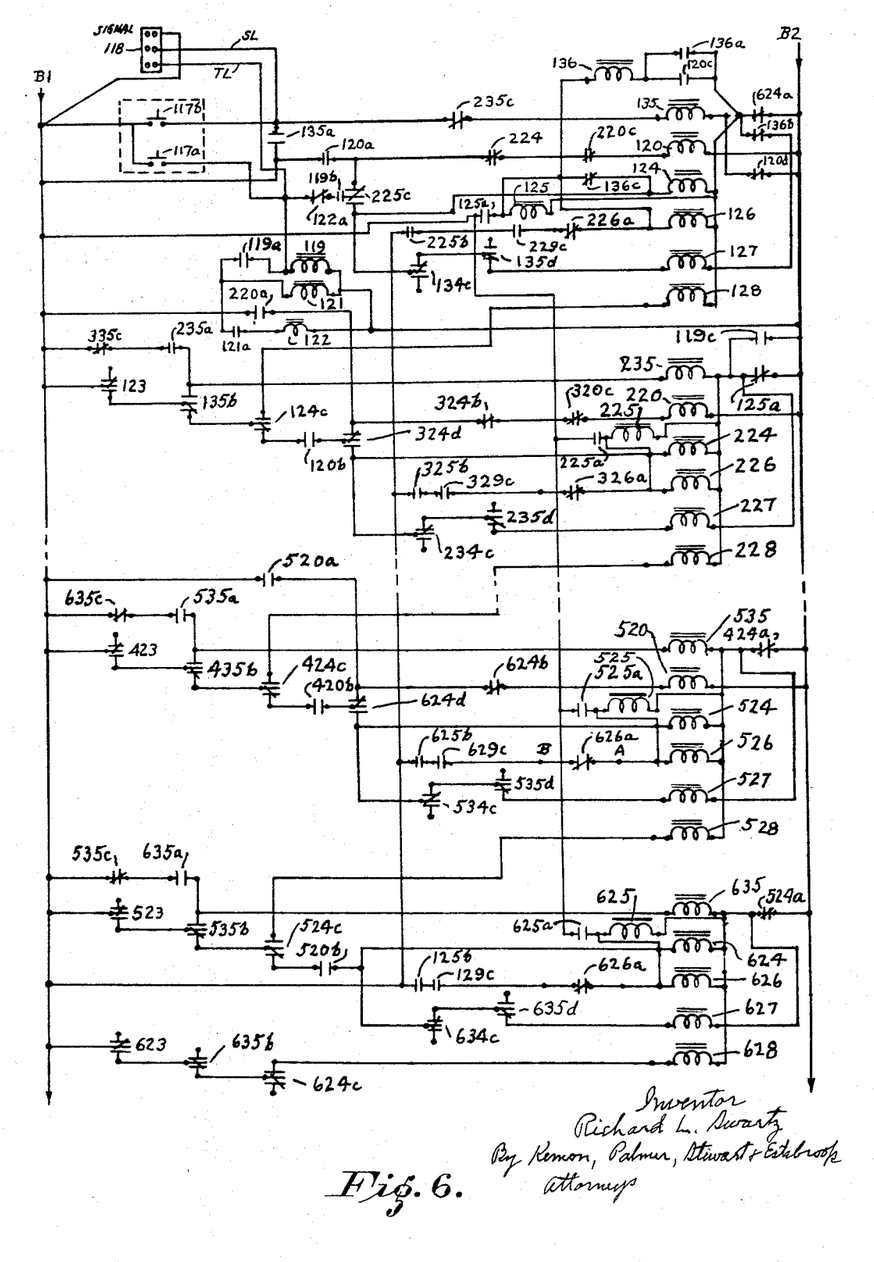
FIGURE 6 is a schematic diagram of the electrical circuits for controlling the operation of the gates of four bins in a 6-bin stacker.
Figure 6A:
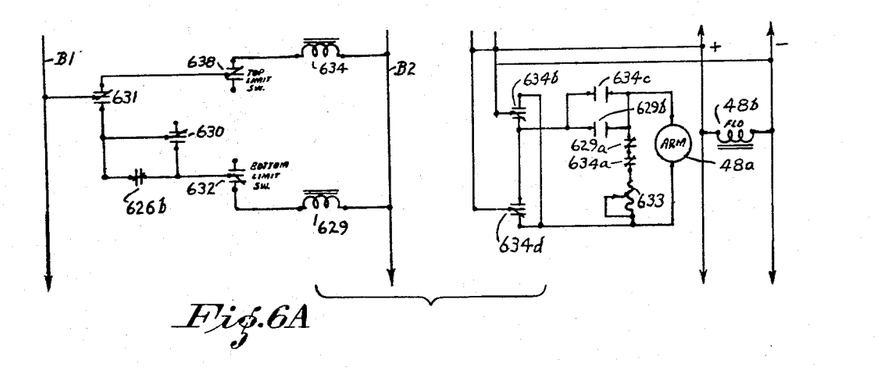
FIGURE 6A shows the circuit by which the separate stacking platforms are raised and lowered by individual motors 48.

The circuits for controlling the gates and other elements in bins 1, 2, 5 and 6 of a 6-bin stacker are shown in FIGURE 6; the circuits of bins 3 and 4 are not shown but are the same as for bin 5. FIGURE 6A shows the circuit for controlling the individual motors for lowering and raising the stacking platforms.

The following table gives the reference characters designating certain elements found in the circuits for bins 1, 2, 5 and 6:

(1) Coils for gate operating magnets
    (magnet 23 of FIGS. 1 and 2) __ 127, 227, 527, 626
(2) Track switches (switch 30,
    FIG. 2) ____________________ 123, 223, 523, 623
(3) Windings of "town" relays ___ 120, 220, 520, 620
(4) Windings of "singles" relays __ 135, 235, 525, 635
(5) Windings of count relays _____ 124, 224, 524, 624
(6) Windings of aux. relays ______ 125, 225, 525, 625
(7) Coils of counter count
    solenoids __________________ 128, 228, 528, 628
(8) Coils of counter clutch
    solenoids __________________ 126, 226, 526, 626

The switching contacts controlled by the relay windings are designated by the same reference numeral as the relay winding plus a letter, for example, two contacts on "town" relay 120 are designated 120a and 120b. The contacts are shown in a conventional manner to represent their normal states.

The windings of three "town" signal relays are shown at 119, 121 and 122.

*Town circuits*

Assuming that all of the bins are empty initially and that the magazine stacker has just been set into operative condition, and assuming furthermore that the first magazines to arrive on the horizontal track section are destined for a town having more than five subscribers therein, the following circuits will be activated:

A "town" signal is applied to the town signal relay 119 either by manual operation of push button 117a or automatically by signal storage device 118. It will be understood that switches 117a and 117b are manually operated and are simple push button switches, while the storage device delivers "town" or singles" signals in accordance with a pre-set schedule or program, which determines whether or not a "town" signal or a "singles" signal is to be applied to the circuit.

Figure 8:
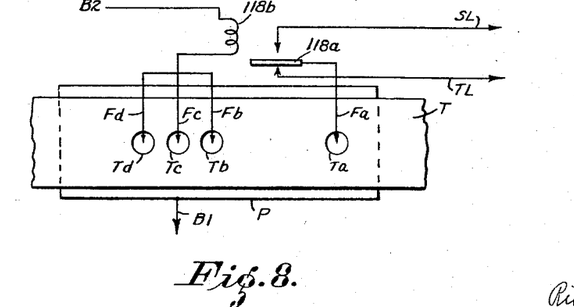
FIGURE 8 is a schematic diagram of one signal storage device suitable for operating the control circuits of FIGURE 6.

One signal storage device suitable for use at 118 for controlling the circuits of FIGURE 6 is illustrated in FIGURE 8. This arrangement involves the use of a tape T which is punched with a series of holes according to different town destinations. In preparing the punched tape T it is driven in synchronism with the tape containing the address labels and an operator, observing the labels in the address tape, punches a hole Ta for a label designating a particular town. The tape T is stepped forward a definite distance for each label, but the punch is not operated if succeeding labels are for the same town. Upon a label appearing for a different town, another hole would be punched as at Tb, and third and fourth holes will be punched as at Tc and Td for the next two different towns found in the address tape.

The spacing between the holes Ta and Tb will be in proportion to the number of magazines which are addressed for the town Ta, and, likewise, the spacing between holes Tb and Tc will be in proportion to the number of magazines directed to the town Tb.

In controlling the operation of the stacker the tape T is driven synchronously with the conveying belt of the stacker and passes over a fixed conducting plate P and beneath resilient contact fingers Fa, Fb, Fc and Fd arranged to engage the plate P whenever a hole in the tape moves into a position beneath the point of the finger. As shown, the contact finger Fa controls a circuit extending from bus B1 through the plate P and finger Fa to the tongue 118a of a control relay having a winding 118b. The tongue 118a normally engages the lower fixed contact to apply a "town" signal to the line TL when a hole is under the finger Fa. Whenever the relay winding 118b is energized through one of the fingers Fb, Fc or Fd, the tongue 118a moves to engage the upper fixed contact and applies a signal from B1 to the "singles" line SL. The relay coil 118b is energized whenever holes appear beneath any one of the fingers Fb, Fc and Fd.

If the bin counters are set for counting in five magazines per stack, as in the present example, a bin gate will not be opened unless adjacent town holes in the tape T are separated by at least four spaces. If holes Ta and Tb, for example, are separated only three stepped spaces of tape T, the hole Tb will energize the relay magnet 118b at the same time that the hole Ta applies signal to the tongue 118a, and a "singles" signal will be applied to the line SL. This signal will close any gate that is open, thus allowing the magazine to pass to the end of the conveyor and into the reject bin. In a like manner if adjacent tape holes are spaced apart by a smaller distance, the magazine will be rejected and not supplied to a bin.

If the minimum stacking count is at a higher number, additional contact fingers will be added to control the relay winding 118b. Where the spacing between adjacent holes, such as Ta and Tb is four spaces or greater, contact finger Fa will apply a "town" signal to line TL and will open the gate of the next bin to be filled and the gate will remain open until either another town signal is received, or until a "singles" signal is received, or until the bin has received its full count of magazines.

For simplicity of operation, the description will be given with respect to the push button signal. When town switch 117a is pressed, it being assumed that all gates are closed, the pressing of this switch completes a circuit from bus B1 through relay 119 to bus B2 thus causing the energization of the relay and the closing of its contacts 119a and 119b. The closing of contacts 119b completes a circuit through normally closed contacts 122a, 119b, normally closed contacts 224b, normally closed contacts 220c and relay 120 to bus B2. With the energization of relay 120 its contacts 120a closes thus completing a holding circuit for relay 120; relay 120 also operates its contacts 120b in the circuit of track switch 123, which is switch 30 (FIG. 2) and is located in advance of the first bin gate 19. As the magazine travels along the horizontal section of the track, it will close track switch 123 and thus complete a circuit through contacts 135b, 124c, now closed contacts 120b, normally closed contacts 324d, 324b, 320c, and thus complete the circuit through the second track relay 220, thus energizing this relay.

During this operation, the original town signal was stepped from relay 119 through its contact 119a to town signal relay 121, which closed its contacts 121a, which in turn energizes town signal relay 122 through to the opposite side of the bus, the operation of relay 122 opened its normally closed contacts 122a in the original circuit of town switch 117a, thus deenergizing or breaking this circuit to relay 120, relay 120 is now holding simply through its contacts 120a; this operation is necessary to prevent feedback from forming a holding circuit for the relays 119, 121, and 122 whereby a false town signal might be generated. Thus, it can be seen that when the operator releases 117a, the relays, 119, 121, and 122 are deenergized and the signal that was impressed is now stepped through relay 120 and down to relay 220 as previously described. The operation of relay 220 opens itse contacts 220c located in the holding circuit of relay 120, thereby deenergizing the relay 120. During this interval, the magazine is still moving over the empty bins, the relay 220 has closed its contacts 220b located in the circuit of track switch 223, which is located just in advance of the second bin. The magazine as it crosses track switch 223 will energize track relay 320, which in turn will step the signal on down to the third track switch energizing another relay and so on until relay contacts 520b in the sixth bin circuit are closed by the fifth track relay 520. It is to be realized that although relays are used in this description substituted stepping devices may be alternately employed. Thus, it can be seen that in the preferred embodiment of my invention magazines will enter the last bin first and as will be explained later the filling operation will proceed in an inverse order, namely, from bin 6 to bin 1 and then repeat itself.

Assuming now that the signal has been stepped down across the empty bins and has energized track relay 520 thus causing its contacts 520b to close; a circuit is now completed, as the magazine trips the fifth track switch 523, through the track switch, through normally closed contacts 535b, 524c, and now closed contacts 520b, to coils 624, 625, 626, and 627 and thence to bus B2 through contacts 524a. Power is applied directly from the bus B2 side of contacts 520b to the relays 624, 625, and counter solenoid 626, which are all in parallel, and from the bus B2 side of contacts 520b through normally closed contacts 634c, 635d, and then to gate solenoid 627. These four coils are therefore energized and are held in this condition by a holding circuit made through the contacts 625a to bus B1.

As the town signal was being stepped down through the different bin control circuits, the preceding track relay was deenergized through the energization of the subsequent track relay, for instance, relay 120 was deenergized upon the energization of relay 220 through the operation of that relay and the opening of its contacts 220c. When the control circuits for bin 6 are energized, the holding circuit for track relay 520 is deenergized by the operation of control relay 624 through the reversal of normally closed contacts 624b in the circuit of 520. Gate solenoid coil 627 is also energized and gate 19 of bin 6 opens to receive the magazines.

Energization of relay 624 (FIGURE 6) caused its contacts 624c to reverse and thus when a magazine trips track switch 623, a circuit is completed through counter count coil 628, thus this coil, the counter count solenoid, causes the count of one to be registered on the No. 6 bin counter. This counter count solenoid will cause a count to be registered for each magazine as it enters the bin and counts toward a predetermined count.

A suitable counter for use in controlling each bin is available commercially and is known as a "microflex" reset counter, "HZ" series, manufactured by Eagle Signal Company. A counter of this type is illustrated in FIGURE 9 of the Jochem Patent No. 2,769,378 referred to above. When used in the circuit of FIGURE 6 for controlling the sixth bin, the counting coil L would correspond to the coil 628 of FIGURE 6, and the clutch coil N would correspond to the clutch coil 626 in FIGURE 6. The two normally closed contacts 626a and 626b of FIGURE 6 would be controlled by the cam element BC3 in the same manner as this cam controls the switch BC4. The elements BC6 would not be used in FIGURE 6 of the present application.

During this period, the platform elevator is in operation as previously mentioned through the use of switches 40 and 41 (FIGURES 1 and 3), the platform and height control switches, and switches 45 and 46, the top and bottom limit switches located on the T post 43. These switches correspond to switches shown in FIGURE 6A as follows: platform switch 40 is shown as switch 631, the height control switch 41 is shown as switch 630, the bottom limit switch is shown at 632 and the top limit switch is shown as 638. Although only one elevator and platform control circuit have been shown, these circuits are the same for all six platforms and platform motors.

The energization of relay 626 caused the opening of normally closed contacts 626b in the circuit of relay 629. Switch 631 is actuated when a magazine arrives on the platform. A circuit is completed, when enough magazines have been received to actuate height control switch 630, through the bottom limit switch 632 and thence through the relay 629. The energization of this relay causes its contacts 629a and 629b to reverse their positions thus opening armature shunting circuits 633, 634a and 629a so that motor 48 (FIGURE 1) is actuated through contact 629b and through normally closed contacts 634d, thus causing the platform to be lowered. Relay 629 will be deenergized as soon as the height control switch 630 opens and this will occur as soon as the platform 37 has descended to such a point that the magazines no longer close the operating lever 41a of this switch. When the relay 629 was deenergized, its contacts once again reapplied the armatures shunt circuit across the motor armature thereby giving the motor a dynamic breaking effect through the normally closed contacts 634a and the shunting resistor 633. The above action of closing and opening the height control switch keeps repeating as long as the magazines are entering the bin, thus maintaining the level of the top magazine within reasonable limits for even stacking.

Ejection of the stack will take place when the predetermined count of magazines has been stacked within the bin in accordance with the cycling speed of the stacker. When the last count is received on solenoid 628 the normally closed contacts 626a and 626b of solenoid 626 are closed due to the superimposed mechanical action of solenoid 628 over solenoid 626 and therefore these contacts close before solenoid 626 is deenergized. The platform switch 631 was closed by the magazines as they began stacking on the platform, thus a circuit is again completed through the now normally closed contacts 626b, the bottom limit switch 632 and the relay coil 629. The previously described actuation of the motor armature will take place and the platform will lower until bottom limit switch 632 is energized and opens in which case the relay 629 will be deenergized. Upon the bottom limit switch being opened, the rollers of platform 37 (FIGURE 3) will have come into contact with the ejector belt 50 and thus the stack of magazines 61 will be discharged onto the rollers of the gravity ejection platform 62. After ejection of the magazines has taken place, the platform switch 631 is returned to its normal state, its normally closed contacts close a complete circuit through relay coil 634, the up elevator relay. When relay 634 energizes, it reverses its normally closed contacts 634a, thus removing the shunt on the armature and the circuit through the motor armature is completed through the reversed contacts 634b, through the motor armature through the contacts 634c through the contacts 634d to the positive side of the supply, thus current has been reversed through the armature and the direction of this motor has therefore been reversed; the platform is now raised until the normally closed side of the top limit switch 638 is opened and the relay 634 is deenergized. The contacts of relay 634 are returned to their normally deenergized position and the motor is now in standby.

After the last magazine has entered bin 6 and the counter for the bin has registered the total count for the bin the contacts 626a and 626b return to their normally closed position. It was at this point that the elevator circuit for the down operation was energized and allowed ejection of the stacked magazines. The energization of relay 629 closed its contacts 629c on the bus B1 side of relay 524 thus energizing relays 524, 525, 526, and 527 in the manner previously described for the corresponding coils in bin 6; these relays are now closed and holding through contacts 525a. The operation of relay 524 caused the relay 528 to operate through the contacts 524c, thus bin 5 is ready to receive magazines and will begin counting as soon as the track switch 523 is operated by a magazine. During this operation, relay 524 caused its contacts 524a to operate in the control circuits for the relays and solenoids 624, 625, 626, 627, and 628 and thus deenergized these circuits permitting them to reset in preparation for their next cycle of operation. The sequence of operations will repeat as each bin is filled, and will step a signal back to the next preceding bin to cause operation of that bin.

*Singles operation*

In the event that a bin is being filled with magazines destined for some particular town and at this point a singles signal is impressed either manually or through the automatic controls on the circuit, the control circuits will cause the gate of this bin to close and allow the single issues to proceed down the track section and off into a receiving tray or bin at the far end of the stacker.

For purposes of description, it will be assumed that bin 2 is being filled and at this point, a singles signal is received. The singles signal will energize relay 135 through the normally closed contacts 235c. The operation of the solenoid will cause its contacts 135a to operate and hold the relay in the energized state. The energization of relay 135 causes its contacts 135b on the bus B1 side of relay 235 to reverse their position and thus complete a circuit through the relay 235 thus causing its energization. This relay is held through the energization of its contacts 235a. When relay 235 is energized, it opened its contacts 235c in the holding circuit of relay 135, thus deenergizing that relay, it also operated its normally closed contacts 235d in the circuit of relay 227, the gate solenoid for bin No. 2, thus deenergizing the gate solenoid and thereby causing the gate 19 (FIGURE 1) for bin No. 2 to close, and at the same time caused its contacts 235b to open thus opening the circuit from the track switch 223 to the bin 2 counter solenoid 228 thus preventing any further count on the bin 2 counter. This last operation occurs prior to the arrival of a singles magazine at the gate for bin 2, thus with the gate closed, the magazine can proceed on down the track and into the singles bin (not shown) at the end of the track. The relay 235 will remain energized until it is canceled by a new town signal being applied either to the manual push button 117a or through the automatic controls 118.

The singles signal can only go down the track to the bin that has a gate open, for example, in this particular case, the energization of relay 224 which was energized in the normal sequence of operation prior to the reception of the singles signal opened its contacts 224a in the circuit of the relay 335, thus this relay could not have operated in any event.

Upon the reception of a new town signal after the singles signal has caused the shut down of the gate of bin 2, the relays and solenoids for the operation of bin 1 are energized as follows: The town signal from the automatic or push button source is passed through the normally closed contacts 122a and also through the parallel relay 119, thus closing the contacts 119b, through the normally opened but now closed contacts 225c which have been energized as the result of the energization of relay 225, and then in parallel through the relays and solenoids 124 and 125 and 126 and 127 thus causing the energization of these controls. When relay 125 is energized, its contacts 125d in the bus 2 side of relay 224 opened; however, the normally opened but now closed contacts 119c, which are in parallel with contacts 125d, operated when the town signal was received on relay 119 and prevents the deenergization of the controls 224, 225, 226 until the termination of the town signals at which time, the contacts 119c will open and will deenergize the relays and solenoids of bin 2.

The control circuits of bin 1 include one additional relay 136, a gate relay which is used in the event a new town signal is received and thus requiring the closing the gate for bin 1 and the sequencing of bin 6 for operation. Upon the reception of a town signal, the relay 120 is operated as previously mentioned, which causes its contacts 120c to close. In so doing, a circuit is completed through holding contacts 125a to relay 136 to the normally opened, now closed, contact 120c of relay 120 through normally closed contacts 624 to bus 2. The energization of relay 136 is now accomplished and the relay is held energized through its normally opened, but now closed contacts 136a that are in parallel to the contacts 120c. The energization of relay 136 causes its normally closed contacts 136b located on the bus B2 side of the control relays and solenoids for bin 1, to open thus deenergizing the gate control solenoid 127 and thus closing bin No. 1 gate. The normally closed contacts 136c located on the T1 bus-side of the relay 124 now open and deenergize relay 124, thus the contacts 124c and the circuit of the track switch 123 resume their normally deenergized position and open the circuit to solenoid 128 thus preventing any further count on the No. 1 counter. This action closes the circuit to relay 220 except for the open track switch 123 which is closed when a magazine trips it. The signal is then stepped down through the relay sequence as previously described. When relay 624 is energized, its contacts 624a located on the T2 bus-side of relay 136 open and completely de-energized No. 1 bin relays and solenoids.

The stacker speed regulation

Figure 7:
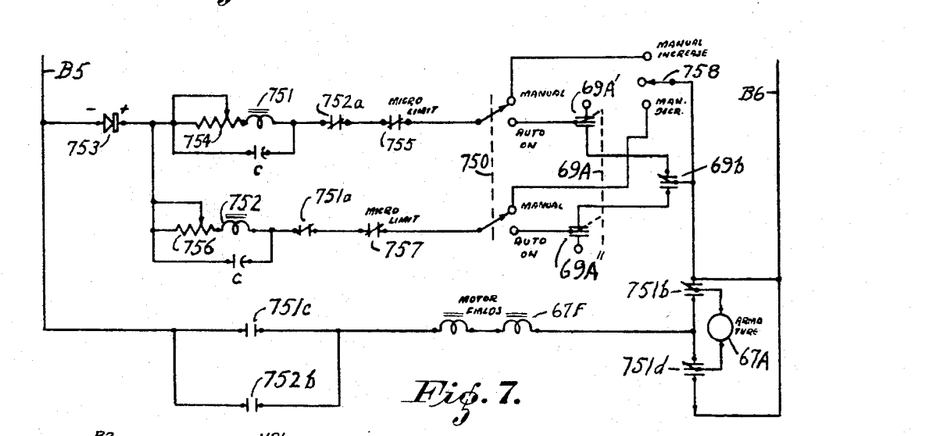
FIGURE 7 is a schematic diagram of the electrical circuits employed for power speed control.

For the purpose of varying the cycling speed of the article stacker two switches 69, FIGURES 1 and 7, shown as 69A′, 69A″ and 69B in FIGURE 7 and as 69A and 69B in FIGURE 1 where 69A in FIGURE 1 represents the ganged switches 69A′ and 69A″, are mounted on the conveyor adjacent to the conveyor belts at the desired flight distance of the magazines; although feeler switches are shown in the present embodiment, it is to be understood that any appropriate substitutional device could be employed such as photo-electric means and the like. Speed regulation of this stacker is achieved with the operation either individually or collectively of the sensing devices in conjunction with the motor control circuit, FIGURE 7. This motor control circuit is utilized to reversibly actuate speed control gear motor 67, FIGURE 5. The control circuit of FIGURE 7 allows automatic or manual operation through the utilization of a manual-auto switch 750. The description of operation of this circuit will be explained with the switch in the automatic position of operation in that this description will make the manual operation of the circuit obvious to those skilled in the art.

Three circuits are essentially shown in the figure, a motor power circuit, an increase speed relay control, and a decrease speed relay control. As magazines travel up the conveyor if the leading edge of a first magazine should trip the uppermost switch, and the leading edge of a second magazine should trip the bottom switch of the two switches 69, then nothing will happen. If the magazines are too close together, from leading edge to leading edge, then the switch 69A will close first before the switch 69B closes, in which case the machine will increase speed; on the other hand, if the magazines are too far apart, switch 69B will close first, thus decreasing the machine speed.

In connection with the present embodiment of the invention, the increasing of speed is obtained by driving the base of the pulley drive motor away from the speed regulation gear motor which, in turn, causes the pulley belt mounted on the split sheaves to ride up on these sheaves, lose tension and thereby increase the drive speed; a reverse operation causes a decrease in pulley speed.

Assuming now that switch 69A has been closed, thus calling for an increase of speed, a circuit will be completed through the rectifier 753 shown in FIGURE 7 through the rheostat 754 through an increase speed relay 751 through the normally closed contacts of the decrease speed relay 752a through a limit switch 755 down through the now reversed contacts switch 69A′ through the normally closed contact side of switch 69B and to the other side of the bus B6. The energization of the increase speed relay thereby causes the reversal of the contacts for this relay, thus completing a power circuit through the contacts 751c through the motor fields then up through the contacts 751b down through the armature and to the other side of the bus 6 through the reversed contacts 751d. During this operation, the contact 751a in the circuit of the decrease speed relay 752 opened, thus a circuit cannot be completed through this relay.

If, on the other hand, the switch 69B has been closed first and the switch 69A is open, then a circuit will be completed through the rectifier 753 through the rheostat 755 in series with the decrease speed relay 752 through the normally closed contacts 751a, through a limit switch 757 through the normally closed contacts if switch 69A″ and through the now reversed contacts of the switch 69B and thence to the bus 6, thus causing the energization of the decreased speed relay, which in turn will apply power through contacts 752b, the motor fields and now down through 751d up through the armature of the motor and through the normally closed sides of contacts 751b and thence to bus 6, thus the motor armature for motor 67 will be caused to reverse in direction. At the same time, the normally closed contacts 752a of the decrease speed relay were energized and opened, thus it would have been impossible for the increase speed relay to have energized. The limit switches are designed to open at either maximum or minimum machine speed.

Manual control of speed is achieved by changing switch 750 to the manual position and then operating the switch 758 manually to apply power *through* either the relays 751 or 752 depending on whether an increase or decrease speed is required. The operation of the circuits will be obvious to those skilled in the art.

The adjustable resistors, the resistance of the relay coil and the size of capacitor C in conjunction with the spring tension of the relay armature release spring determines the delay time for drop out of the relay. The duration of the delay time is determined by the magazine flight interval time with the machine running at approximately half speed. Thus, at the higher speeds, this gives a continuous speed rate change, i.e., keeps the speed regulator motor energized continually, until both switches are depressed simultaneously, which as mentioned earlier deenergized the motor control circuit in the motor. At slower speeds, this delay is long enough to change the speed with the passage of only a few magazines.

The operation of my machine is believed to be apparent from the foregoing description, but a brief summary of the operation is as follows:

It will be assumed that the inclined conveying section has been adjusted to receive magazines from a labeling machine and that each storage bin has had its counter set to receive a predetermined count of magazines to form a stack in accordance with a pre-set speed of operation for the stacking device. Magazines will be received on the conveying belt 10 (FIG. 1) and guided up the inclined conveyor between the adjustable guides 39 on the conveyor and held in tension by the tension belt 11 until they arrive at the horizontal track section where they will be propelled down the trackway under the force of the impulse rollers 17 and the hold-down belt 22. Assuming that all storage bins are empty, the magazines will be propelled to the end, right hand, storage bin 6 which will have its gate 19 operated in conjunction with a town signal received either through the push button control 117a (FIG. 6) or from the automatic control 118 operating in conjunction with a storage device not part of this invention. The magazines will be deflected down into the storage bin by the open gate and will be stacked between the impact plate 16 and rebound plate 38. As the magazines stack upon the receiving platform, they will operate switches 40 and 41 (FIG. 3) to cause the platform to adjust itself downward in order that the pocket may be filled to its scheduled count without causing a jam at the gate. Upon the completion of the count for the sequenced bin, the gate 19 of bin 6 will close and a signal will be stepped back to the empty bin 5 causing the gate on this bin to open and thereby continue the stacking of magazines for the particular town. At the same time, the control relay 629 (FIG. 6) for the receiving platform of the now filled bin (bin 6) will be energized causing this platform to descend and come into contact with ejection belt 50 (FIG. 3) whereupon the completed stack of magazines 61 will be ejected onto the gravity ejection conveyor 62. This releases platform switch 40 which, in turn, will cause the up elevator relay 634 (FIG. 6) to operate and the platform will be returned to its initial position through the operation of the top limit switch 45 (FIG. 3) or 639 (FIG. 6).

In the event that a new town signal is received while a bin is filling, this signal will cause the gate of that bin to close and will prepare the next stacking bin to operate as heretofore described.

In the event that a singles signal is received either on switch 117b (FIG. 6) or the automatic signal connection 118, a signal will be passed down through the relays 135, 235, and so on until the signal is received at the bin that is presently being filled with magazines in which case that bin will have its gate solenoid 223 deenergized and the gate will be closed. Thus, the magazines that are coded as singles will pass off the end of the conveyor into an appropriate reject bin or tray.

If after a singles operation has been performed, a new town signal should be received, then this town signal will cause a deenergization of whatever signals relays x35 had been operated and will prepare the next bin for receiving the magazines for the new town. The cycling operation will then continue as described heretofore.

Due to the fact that my machine does not employ fixed guides for engaging the sides of the articles carried by the conveyor, the machine is adapted for the sorting of various size magazines, and articles of a similar nature, which could be stacked within the storage bins.

By arranging the bins along the horizontal trackway in the number of six bins, it is possible to achieve high speed cycling of the machine, in that the machine speed is variable from 6,000 to 20,000 pieces per hour, and it is possible to cycle each pocket in approximately 4½ seconds for a minimum number of five magazines per pocket. This is not the maximum speed possible, however, but it is sufficient and gives a smooth operation on ejection from the pockets.

I claim:

1. A machine for counting and stacking articles comprising in combination, a plurality of stationary article-receiving bins arranged in a row, an article-conveying trackway having a floor extending over the top of all of said bins, said trackway floor embodying a pivoted gate section arranged above each bin and being operative when pivoted out of the plane of the floor to deflect articles downwardly into the bin, an electric system for controlling the operation of said gates and including counting means for counting the articles deposited in each bin, and means controlled by said counting means and being responsive to a predetermined number of articles passing into each bin to effect closure of the gate of the bin and opening of the gate of the next preceding bin.

2. A machine according to claim 1 wherein the bottom wall of each bin is formed separately from the side walls and forms a platform on which articles are stacked within the bin, means mounting said platform for vertical movement out of the lower end of the bin and into an unloading position, and conveying means for removing the stack of articles from each platform in its unloading position and conveying the stack in a direction transversely of the direction of said trackway.

3. A machine according to claim 2 and including means controlled by articles on said platform and being responsive to removal of the stack of articles from said platform for effecting return of the platform to a position within said bin.

4. A machine according to claim 1 wherein the bottom wall of each bin is formed separately from the side walls and forms a platform on which articles are stacked within the bin, means mounting said platform for vertical movement within said bin, means normally maintaining said platform in a position near the top of the bin, and means responsive to articles introduced within said bin for effecting downward movement of said platform in successive steps to prevent jamming of articles in the entrance to the bin.

5. A machine according to claim 2 wherein said platform has mounted therein a plurality of rollers arranged parallel with the direction of said trackway, said rollers serving to support the stack of articles, and wherein said conveying means for removing the stack of articles from the platform comprises driving means engaging said rollers when the platform is in unloading position for rotating said rollers in a direction to move the stack in the desired direction of ejection.

6. A machine according to claim 5, wherein said driving means is reversible, whereby said stack may be ejected to either side of said row of bins.

7. A machine according to claim 1 wherein each bin includes an additional wall located adjacent the front wall of the bin and serving to align the trailing edges of the articles deposited within the bin, means mounting said additional wall for adjustment towards and from the rear wall of the bin to accommodate articles of different width, and a common adjusting means interconnecting all of said additional plates for simultaneous adjustment of the additional plates in a plurality of bins.

8. A machine according to claim 1 wherein said electrical system for controlling the operation of said gates comprises:

a signal generator for producing first and second control signals;

first circuit means operatively connected to said signal generator and to said gates and responsive to said first control signal for conditioning said gates to be opened;

second circuit means operatively connected to said signal generator and to said gates and responsive to said second control signal for conditioning said gates to be closed; and third circuit means operatively connected to said first circuit means and to said gates for opening said gates when said first circuit means is energized, and operatively connected to said second circuit means and to said gates for closing said gates when said second circuit means is energized.

9. A machine according to claim 8 wherein said signal generator comprises in combination a tape punched with a plurality of holes, the spacing between said holes corresponding to the number of articles placed on said article-conveying trackway having like identity; an electrical circuit; means for extending said electrical through the punched holes in said tape; and relay means in said electrical circuit and operatively connected to said first and third circuit means for producing said first control signal when the distance between the punched holes in said tape is equal to a predetermined length of tape, and for producing said second control signal when the distance between said punched holes is less than said predetermined length of tape.

10. A machine according to claim 8 wherein said first circuit means comprises:
a plurality of associated electrical circuits where one each of said circuits is operatively connected to one each of said gates, said circuits being arranged in a chain like configuration such that energization of one circuit conditions the next circuit in sequence for energization.

11. A machine according to claim 8 wherein said second circuit means comprises:
a plurality of associated electrical circuits where one each of said circuits is operatively connected to one each of said gates, said circuits being arranged in a chain like configuration such that energization of one circuit conditions the next circuit for energization.

12. A machine according to claim 8 wherein said third circuit means comprises a plurality of pressure operated switches longitudinally spaced along said trackway such that said switches are operated by articles on said trackway, each of said switches being connected to said first circuit means for sequentially opening said gates, and to said third circuit means for sequentially closing said gates.

13. A machine for stacking articles comprising a bin having an entrance in the top thereof for receiving articles supplied to the bin in succession, the bottom wall of said bin being formed separately from the side walls and comprising a platform on which the articles entering the bin are stacked within the bin, means mounting said platform for vertical movement within said bin, means including an electrical circuit normally maintaining said platform in a position near the top of the bin, means responsive to articles introduced within said bin for effecting downward movement of said platform in successive steps to prevent jamming of articles in the entrance to the bin, and means controlled by articles on said platform and being responsive to removal of the stack of articles from said platform for automatically effecting return of the platform to its initial position within said bin and near the top thereof.

14. A machine according to claim 13 wherein said means for effecting downward movement of said platform comprises:
a first switch mounted in said platform and operated by articles received on said platform;
a second switch mounted adjacent to said platform and operated by said articles;
a motor drivingly connected to said platform; and
circuit means connected to said first and second switches and said motor for energizing said motor in response to the operation of said switches.

15. A machine according to claim 14 wherein said circuit means includes a switch for de-energizing said motor after said platform has traveled a predetermined distance downward.

16. A machine according to claim 13 wherein said means for effecting return of said platform to its initial position includes:
a switch mounted in said platform, said switch being operated to a first position upon receipt of articles on said platform and to a second position upon removal of articles from said platform;
an electrical motor drivingly connected to said platform;
circuit means connected to said switch and to said motor for energizing said motor when said switch is operated to said second position; and
means connected to said circuit means for de-energizing said motor after said platform has been moved a predetermined distance.

17. A machine according to claim 13 wherein said means responsive to articles for effecting downward movement of said platform and said means for effecting upwards movement of said platform comprise:
an electrical motor drivingly connected to said platform;
an article activated switch mounted in said platform;
first circuit means connected to said switch and to said motor for automatically driving said motor in a first direction in response to articles being received on said platform; and
second circuit means connected to said switch and to said motor for automatically driving said motor in a direction reversed with respect to said first direction in response to articles being removed from said platform.

18. A machine according to claim 1 wherein said article-conveying trackway is provided with automatic speed adjusting means including article sensing devices, for automatically varying the speed of said trackway in response to the spacing between articles received on said trackway.

19. A machine according to claim 18 wherein said automatic speed adjusting means comprises:
driving means operatively connected to said article conveying trackway for driving same;
switching means longitudinally displaced along and mounted in said trackway for sensing the presence of articles on said trackway; and
circuit means operatively connecting said switching means and said driving means for automatically varying the speed of said driving means.

References Cited by the Examiner

OTHER REFERENCES

| | | | |
|---|---|---|---|
| 2,769,378 | 11/1956 | Jochem | 93—93.3 |
| 2,957,691 | 10/1960 | Williams. | |
| 3,101,851 | 8/1963 | Heide et al. | 214—6 |
| 3,187,649 | 6/1965 | McAlpine et al. | 93—93.3 |

BERNARD STICKNEY, *Primary Examiner.*